Aug. 20, 1935.  H. A. DOUGLAS  2,011,676
COMBINED CLAMP AND TERMINAL SLEEVE
Filed June 13, 1932
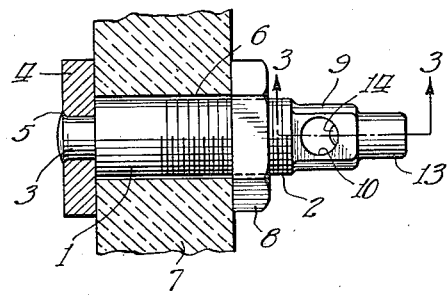
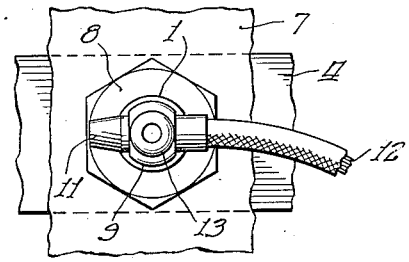
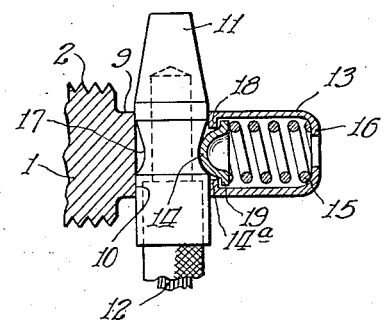
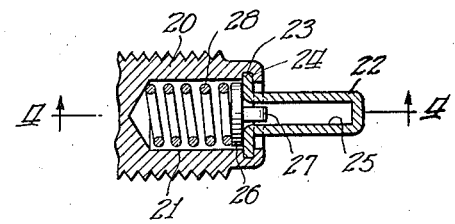
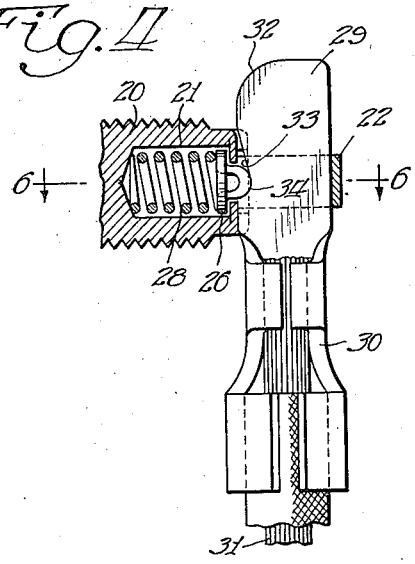
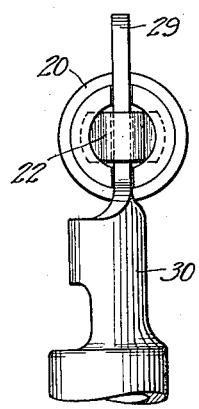
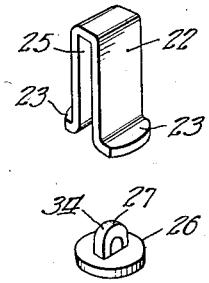
Inventor
Harry A. Douglas
By Langdon Moore
Atty.

Patented Aug. 20, 1935

2,011,676

UNITED STATES PATENT OFFICE 2,011,676

COMBINED CLAMP AND TERMINAL SLEEVE

Harry A. Douglas, Bronson, Mich.

Application June 13, 1932, Serial No. 616,842

2 Claims. (Cl. 173—328)

This invention relates to a combined clamp and terminal sleeve more particularly for electrical conductors.

The invention has particular utility in connection with switchboards for telephone exchanges and the like.

Among other objects, the invention aims to provide improved means for clamping an electrical conductor such as a bus bar to an insulating support combined with a terminal receiving sleeve for the terminal of a current conducting wire, for example, the combined clamp and sleeve providing an electrical connection between the conductors and preferably having means for making a snap connection with the wire terminal.

Other objects and advantages will be readily apparent to those skilled in the art.

The invention will be understood by reference to the illustrative constructions shown in the accompanying drawing, in which—

Figure 1 is a vertical section through a bus bar and a part of its support with the invention applied thereto;

Figure 2 is a partial end view of the structure of Figure 1 taken from the right hand side and showing a wire connected thereto;

Figure 3 is a section taken on the line 3—3 of Figure 1 with the wire connected as in Figure 2;

Figure 4 is a view similar to Figure 3 of a modified form of the device adapted to receive a different form of wire terminal;

Figure 5 is a right hand view of the structure of Figure 4;

Figure 6 is a section taken on the line 6—6 of Figure 4 with the wire terminal removed; and Figure 7 is a view of some parts in separated relation.

The combined clamp and terminal sleeve illustrated in Figures 1, 2 and 3 of the drawing includes a cylindrical metal shank 1 having the screw threads 2 upon the exterior thereof. In this instance, one end of the shank is reduced as at 3 to form a rivet portion by means of which the shank 1 is rigidly connected with an electrical conductor such as the metallic bus bar 4, the reduced end 3 passing snugly through a similarly shaped aperture in the bus bar and the bus bar being riveted between the body 1 of the shank and an annular shoulder 5 formed by peening the reduced portion 3 over the bus bar 4. The shank 1 is then passed through a cylindrical aperture 6 in the insulating support 7 and the shank and bus bar are clamped to the support by the clamping nut 8 which is turned on the threads 2 to draw the bus bar 4 tightly against the support.

At its end opposite the shoulder 5 and upon the opposite side of the clamping nut 8 I have shown a terminal sleeve 9 which in Figures 1, 2 and 3 is formed integrally with the shank 1. The terminal sleeve 9 has a cylindrical aperture 10 therein snugly receiving the conventional bulbous shape wire terminal 11 which constitutes the metallic terminal for the insulated current conducting wire 12. The shank 1 therefore constitutes both a mechanical and electrical connection between the wire 12 and the bus bar 4.

The wire terminal 11 is desirably yieldingly received in the aperture 10 with a snap action and to this end the sleeve portion 9 is continued to form the integral spring barrel 13 which after the detent 14 and coil spring 15 have been located therein has its outer end spun inwardly as at 16 to form a bearing for one end of the spring 15. At its other end the spring 15 presses against the detent 14 and urges the detent into the aperture 10 through the opening 14a communicating with the aperture 10 and with the interior of the spring barrel 13 to permit the detent to snap into the annular groove 17 in the bulbous shape terminal 11 when this has been inserted in the aperture 10 against the action of the spring 15. The detent 14 may be dome-shape and interengaging annular shoulders 18 and 19, respectively, in the spring barrel 13 and on the detent 14 may limit the movement of the detent into the aperture 10. The terminal 11 may be removed from the aperture 10 by pulling firmly upon the wire 12.

In the modification shown in Figures 4 to 7 inclusive the respective positions of the spring barrel and terminal sleeve are reversed. As best shown in Figures 4 and 6, the shank 20 corresponding to the shank 1 in the previous views is recessed at its terminal receiving end to form a spring barrel 21. In this instance, the terminal receiving sleeve is not integral with the shank but embodies a U-shape sheet metal flat sided sleeve 22 which has its sides folded toward each other but in spaced apart parallel relation and terminating in laterally directed anchor portions 23 which are riveted in the end of the shank 20 as at 24 thus firmly securing the sleeve 22 to the shank. The sides of the sleeve 22 where folded together are spaced apart to provide the rectangular aperture 25 which thus communicates with the spring barrel 21. In the modification here shown the detent disc 26 movable in the spring barrel 21 has struck out centrally thereof a flat nose 27 which is received in the rectangular aperture 25 in the sleeve 22 and is pressed thereinto by the spring 28, the disc portion 26 of the detent being pressed against the anchor portions 23 of the sleeve 22 and against the riveted end of the shank 20 where these anchor portions are riveted thereto, to limit movement of the detent into the aperture 25.

The rectangular aperture 25 may receive snugly therein the flat portion 29 of a wire terminal 30 which constitutes a metal terminal or the current conducting wire 31. The flattened end 29 of the terminal 30 is provided with an irregular edge and in this instance has a rounded corner 32 thereon and a cutaway portion 33 in one longitudinal edge providing a detent receiving recess for the detent 26, the nose 27 of the detent also being rounded as at 34 to ride over the rounded corner 32 of the terminal and to snap into the recess 33.

In each instance the clamping nut 8 is reciprocable over the terminal receiving sleeve and spring barrel to engage and be disengaged from the threads 2. Thus the connector is readily clamped to its support or detached therefrom.

Having described exemplary embodiments of my invention, I claim:

1. A combined clamp and terminal sleeve including a cylindrical metal shank adapted to be passed through an aperture provided therefor in an insulating support, having means at one end for rigid attachment to a conductor bar and exteriorly screw threaded about the other end for receiving a clamping nut, said screw threaded end provided with an axial cylindrical recess having a counter bored outer end, a spring mounted within the recess, a plate resting upon the spring provided with a diametrical struck up portion, a U-shaped terminal receiving member having the out turned ends received within the counter bored portion of the shank and resting upon said plate and the metal about the counter bored portion spun over to engage and retain the terminal receiving member rigidly upon the shank, with the struck up portion of said spring pressed plate entering between the legs of the terminal receiving member and extending beyond the end of the shank to act as a detent to detachably engage a terminal when inserted in said member to continue an electric circuit from said terminal to said conductor bar.

2. A terminal-receiving sleeve, including a metal shank having a cylindrical recess at one end, a spring within the recess, a plate having a struck-up portion mounted upon the spring, a U-shaped terminal-receiving member mounted with its out-turned ends upon the plate and the metal of the end about the said recess formed to engage said out-turned ends to retain the said terminal-receiving member and spring-pressed plate within said recess with the struck-up portion extending between the legs of the U-shaped member providing a detent adapted to engage a terminal when inserted therein.

HARRY A. DOUGLAS.